Figure 1A:
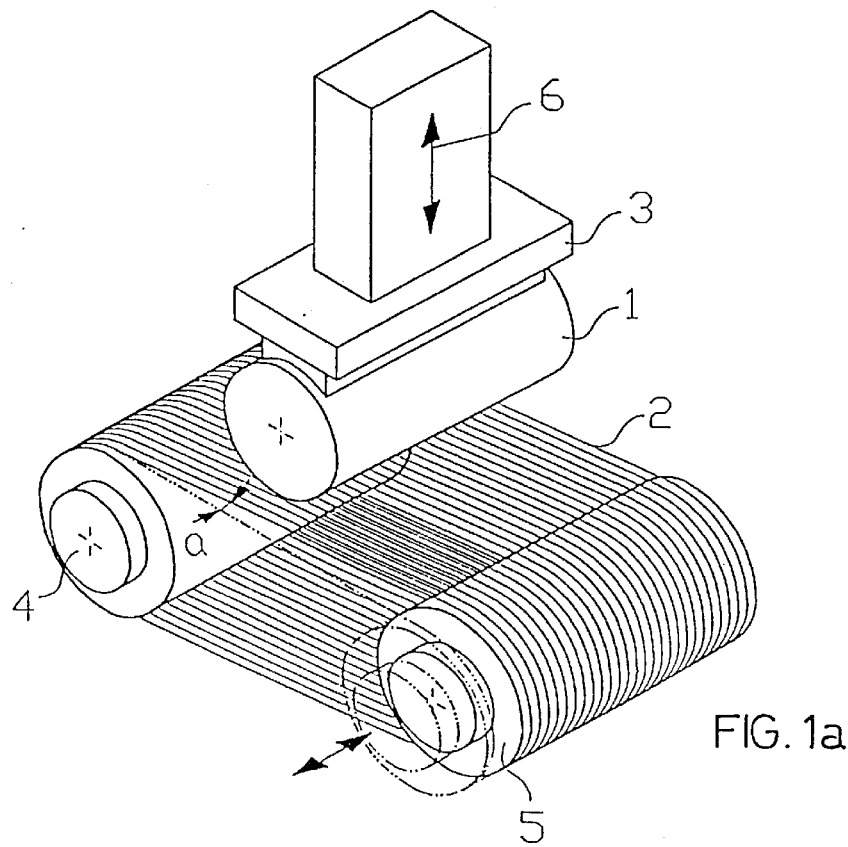

United States Patent
Hauser

[11] Patent Number: 5,913,305
[45] Date of Patent: Jun. 22, 1999

[54] CUTTING DEVICE WITH WIRES

[75] Inventor: Charles Hauser, Genolier, Switzerland

[73] Assignee: HCT Shaping Systems SA, Cheseaux, Switzerland

[21] Appl. No.: 08/862,609

[22] Filed: May 23, 1997

[30] Foreign Application Priority Data

May 23, 1996 [CH] Switzerland .............................. 1295/96

[51] Int. Cl.⁶ ...................................................... B28D 1/08
[52] U.S. Cl. ...................................... 125/16.02; 125/16.01; 125/21
[58] Field of Search ..................................... 451/296, 304, 451/305; 125/16.01, 16.02, 16.04, 21

[56] References Cited

U.S. PATENT DOCUMENTS

| | | | |
|---|---|---|---|
| 3,831,576 | 8/1974 | Mech | 125/21 |
| 5,201,305 | 4/1993 | Takeuchi | 125/21 |
| 5,269,285 | 12/1993 | Toyama et al. | 125/21 |
| 5,715,807 | 2/1998 | Toyama et al. | 125/21 |

FOREIGN PATENT DOCUMENTS 5169434  7/1993  Japan ....................................... 125/21

*Primary Examiner*—Eileen P. Morgan
*Attorney, Agent, or Firm*—Young & Thompson

[57] ABSTRACT

The cutting device includes a web (2) of parallel wires capable of an alternating or a continuous motion while pressing against a work piece (1) fixed to a support table (3). The device includes angle changing devices (13, 16) for realigning the wires relative to the support table.

10 Claims, 5 Drawing Sheets

CUTTING DEVICE WITH WIRES

The present invention is aimed at a cutting device with wires, comprising a web of wires held taunt between at least two wire guiding cylinders and maintained in position by grooves cut out at the surface of said wire guiding cylinders to define the spacing between the wires of said web of wires, these wires being capable of an alternating or of a continuous motion while pressing against the work piece to be cut, fastened to a support table.

In known devices, the cutting zone is comprised of an arrangement of parallel cylinders. These cylinders, called wire guides, are engraved with grooves defining the spacing between the wires of the web, i.e. the thickness of the slices. The work piece to be cut is fastened to a support table which moves perpendicularly to the web of wires. The speed of motion defines the cutting speed. The renewal of the wire, as well as the control of its tension are carried out in a part called the management zone of the wire, located outside of the cutting zone properly said. The agent which will ensure the cutting is an abrasive bonded to the wire or an abrasive supplied as a slurry, in which case the wire acts only as a carrier.

When cutting the work piece into fine slices, the wire held taunt, is both guided and pulled by the wire guiding cylinders. These cylinders, generally carrying a synthetic coating, are engraved with grooves of which the geometry and the dimensions must be very accurate. Furthermore, when the work piece to be cut is a monocrystal, the direction of the cut has a considerable importance, therefore also the direction of the wire with respect to the monocrystal itself and, consequently, with respect to the support table for the work piece to be cut. To achieve a high accuracy, a device for controlling the support table relative to the wires of the web is generally provided and constructed as a rotatory platen, which is adjustable in rotation and which is placed between the machine and the support table. The support table then becomes a support table. In most cases, this rotation is used for fine adjustments, the basic orientation being imparted by means external to the cutting device and the fine adjustment not exceeding a few degrees. The implementation of a rotatory platen of a high accuracy and without looseness in an environment polluted by abrasive material causes several difficulties, in particular concerning its protection. Furthermore, the superposition of mechanical members situated beneath the work piece to be cut decreases the rigidity and hence the overall accuracy of the cutting device. The place needed for the insertion of the rotatory mechanical member used for the orientation of the wire relative to the support table increases the height, the weight and the overall bulk of the cutting device, therefore increases the problems associated with the outlay of the equipment and its transport and increases cost because of the large number of component parts.

The present invention is aimed at remedying these drawbacks and, to this end, is characterized in that the cutting device includes means for orienting angularly the web of wires with respect to the support table and for conferring to said web of wires the capacity of rotating relative to the support table, hence relative to the work piece to be cut.

Owing to these characteristics, the height and the overall bulk of the cutting device can be reduced. The transport and the layout of the device are facilitated. The manufacturing costs and the number of component parts can be maintained low, while providing a unit easier to use, more rigid and therefore more robust.

Generally speaking, the alignment of the web of wires relative to the direction of the support table can be carried out in three different manners.

1) By orienting the support table relative to the web of wires, which is fixed. Use is made of a rotatory table.
2) By orienting the web of wires relative to the support table, which is fixed. Use is made of a rotatory web.
3) By orienting the support table and the web of wires, both being adjustable separately. Simultaneous use is made of a table and of a web, both being rotatory.

Case 1) corresponds to known devices. Case 3) offers no advantage, since it has all the drawbacks of both the first and the second method.

Conversely, for a directional alignment which generally necessitates no extensive corrections, case 2), by ensuring the alignment of the web of wires with respect to the fixed table, provides a new construction in which the web of wires itself is rotated. This rotation can be ensured, for example, by an axial translation of one of the wire guides adjoining the work piece to be cut. This translation of one of the adjoining wire guides will cause a rotation of the direction of the wires of the web, making thus possible the alignment with the support table. The axial translation of one of the wire guides can be carried out mechanically, manually or electrically, for example by means of a screw centered on the wire guides, or hydraulically or pneumatically, by using an appropriate jack. Since the support table is moved along an axis perpendicular to the rotatory web of wires, the adjustment of the orientation of the rotatory web of wires can then be readily controlled by means of an optical or of a video system, either simple or double, incorporated into the fixed part of the cutting device and aiming in a direction running parallel to the displacement axis of the support table. Preferably, the two objectives of an optical system or the two cameras of a video system will be positioned in a direction parallel to the direction of the wires of the rotatory web of wires in their final working position.

The use of a rotatory table does not allow an easy incorporation into the fixed part of the cutting device of an optical or of a video control system. The latter must be incorporated into the rotatory part, which complicates considerably the construction.

The cutting device according to the invention, through the provision of its rotatory web of wires, makes it possible to orient the web of wires relative to the support table, by carrying out a rotation of the web of wires. This limits the number of mechanical component parts required, by comparison with the rotatory table, and decreases the complexity of the installation, while increasing the rigidity of the cutting device. Furthermore, the permanent incorporation of an optical control system or of a video control system facilitates the work of the operator, while minimising the risks of adjustment errors.

Accordingly, the use of the construction including a rotatory web of wires makes it possible to design an efficient cutting device having a high productivity, an average accuracy increased by the increased rigidity and allowing an alignment of the support table by the rotation of the rotatory web of wires.

Other advantages are achieved by virtue of the characteristics set out in the following description of the invention, with reference to drawings which represent schematically and by way of example different embodiments thereof.

Figure 1B:
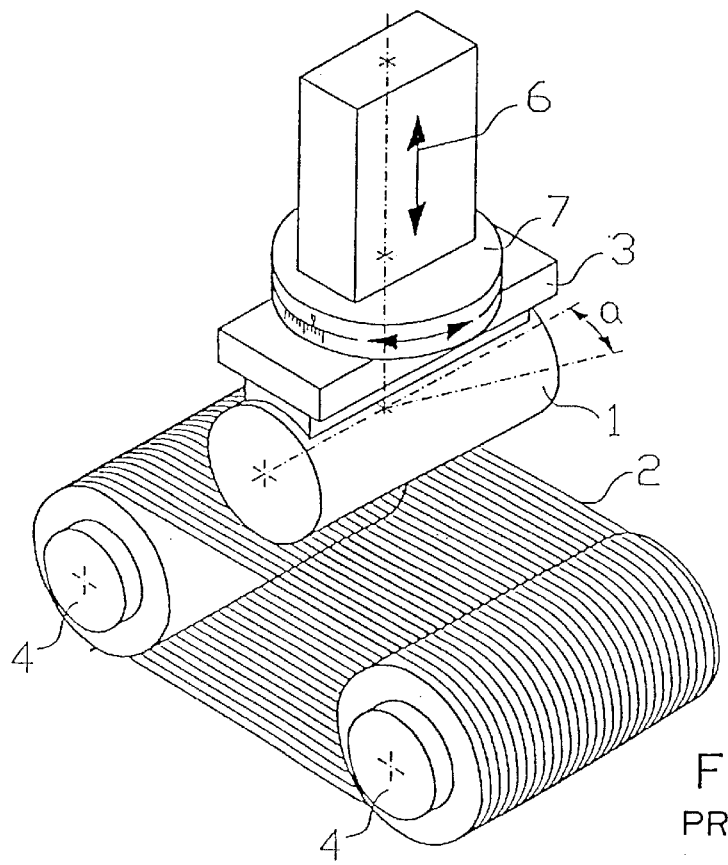
Figure 2A:
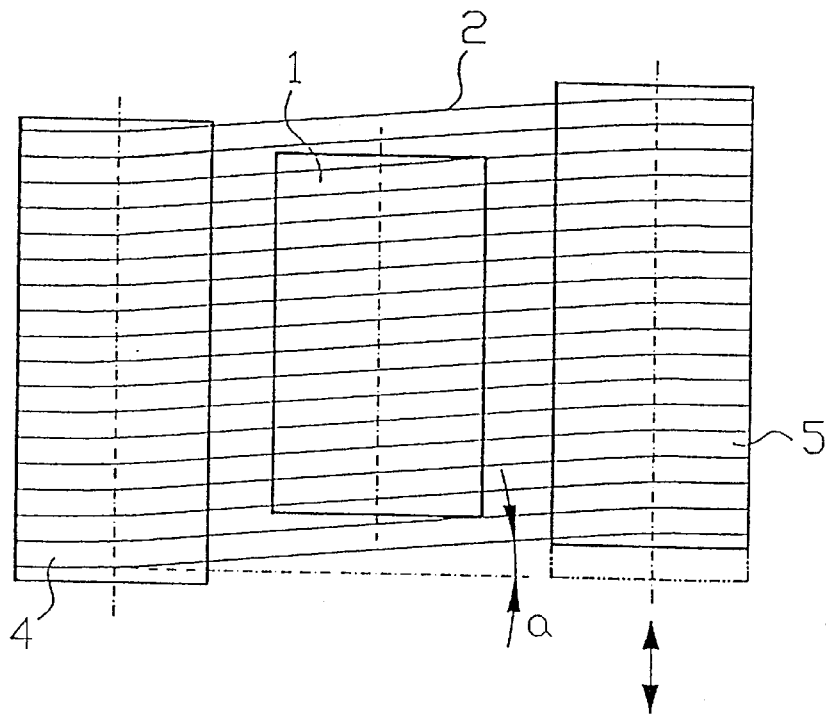
Figure 2B:
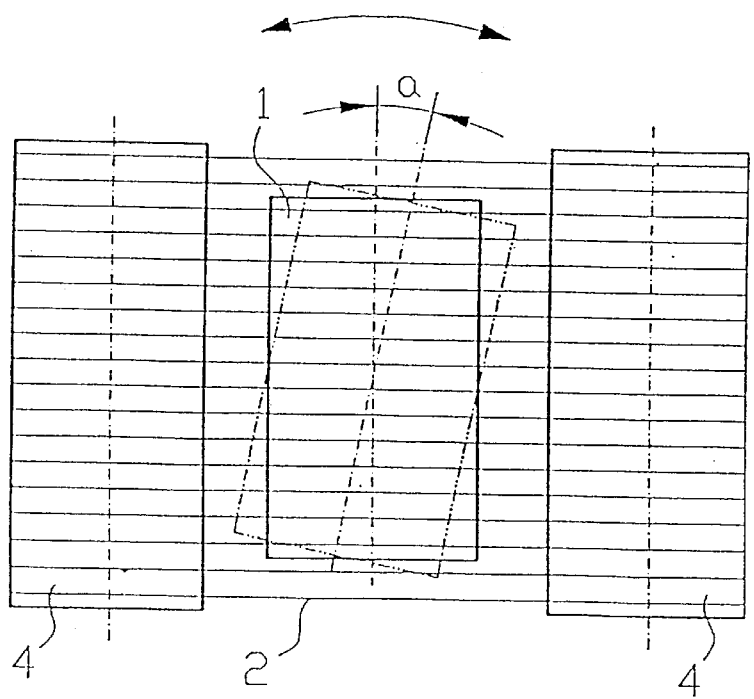
Figure 3:
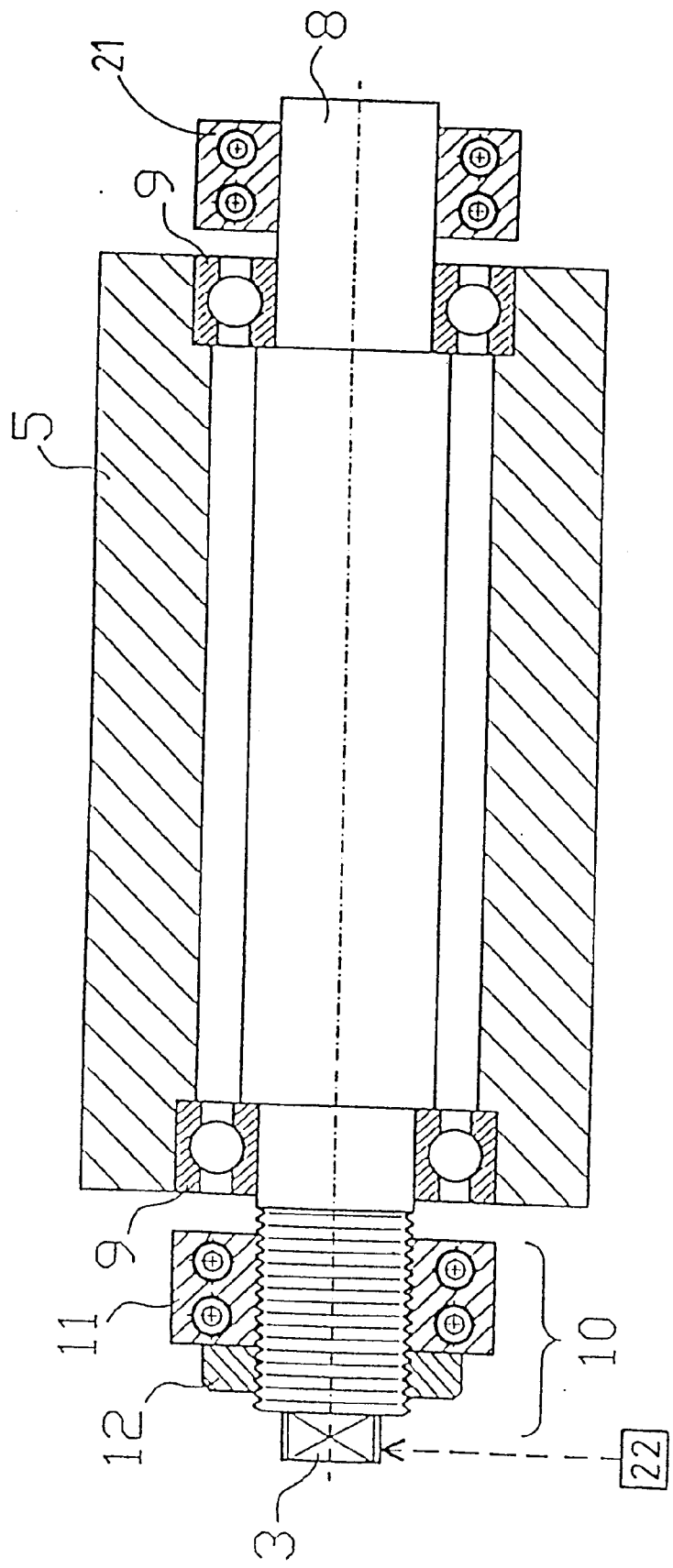
Figure 4:
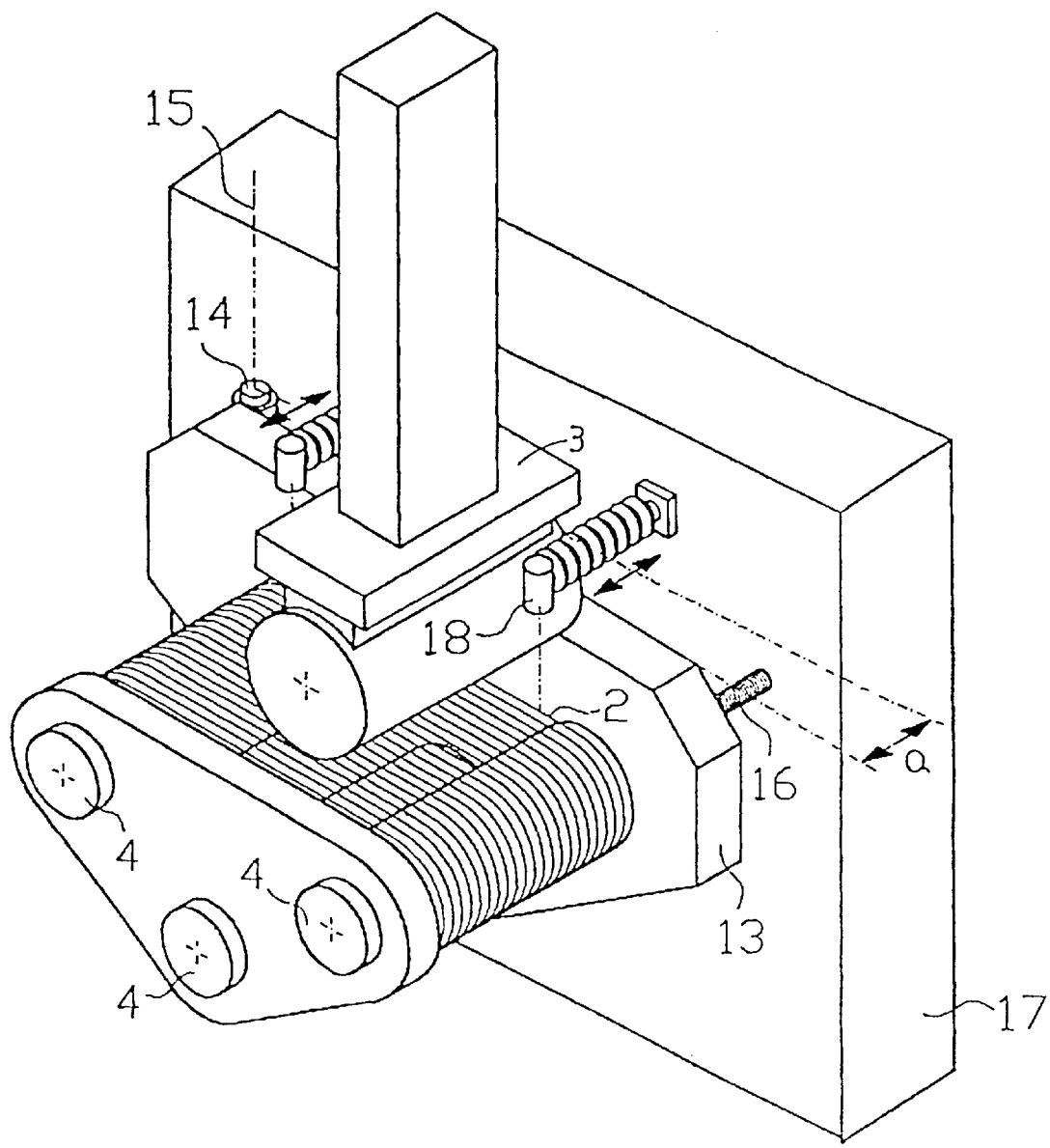
Figure 5:
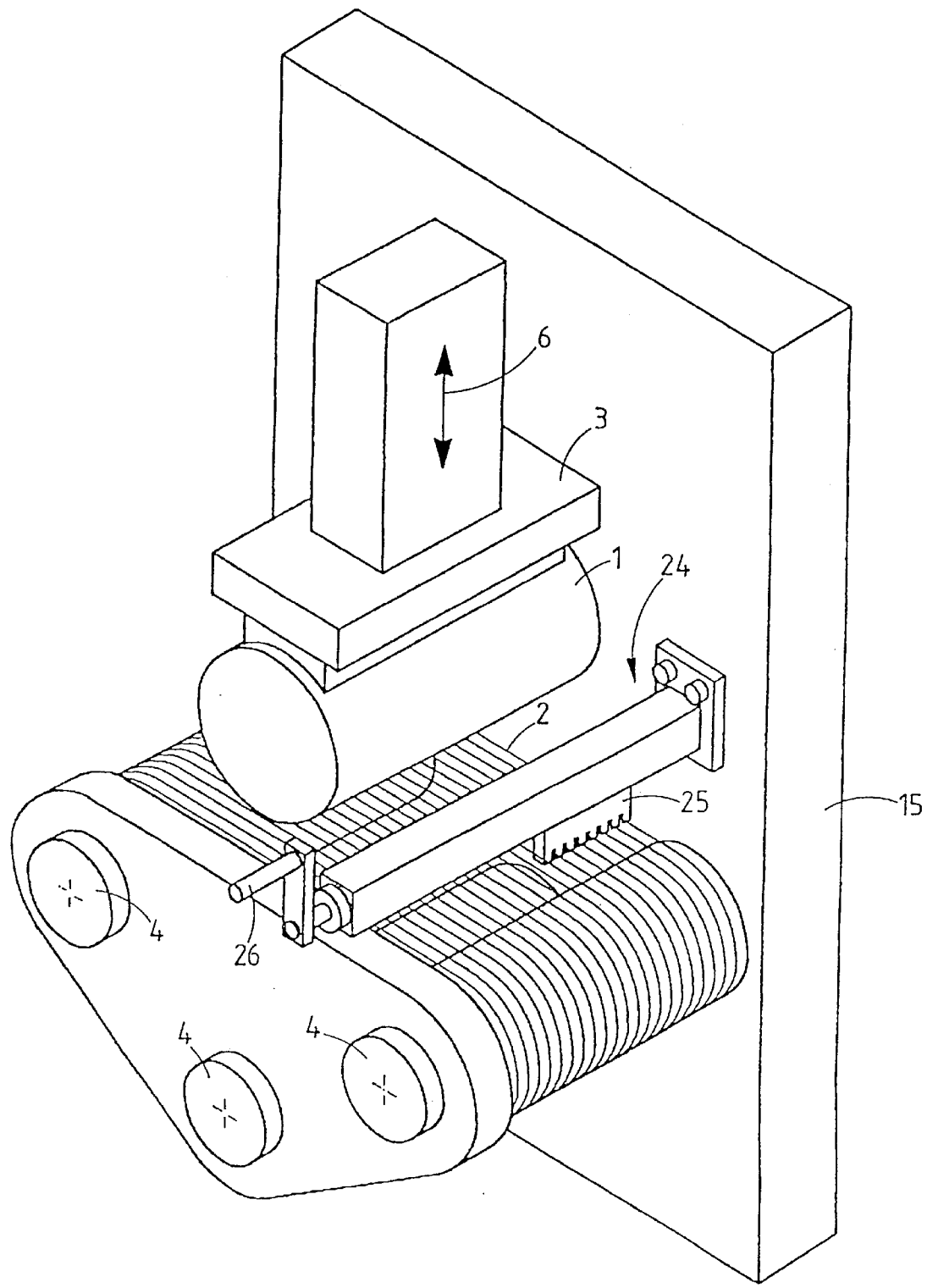

FIG. 1a is a perspective view of a first embodiment.
FIG. 1b is a perspective view of a known device.
FIGS. 2a and 2b show the web of wires and the work piece to be cut of FIG. 1a and FIG. 1b, respectively.
FIG. 3 is a detailed cross-sectional view taken through the wire guiding cylinder of FIG. 1a.
FIG. 4 is a perspective view of a second embodiment.
FIG. 5 is a perspective view of a third embodiment.

With reference to FIG. 1a, a work piece 1 to be cut is pressed against a web 2 of wires, supported by the wire guiding cylinders 4, 5. The support table 3 on which is fastened the work piece 1 to be cut moves along direction 6. The wire guiding cylinder 4 is fixed, whereas the wire guiding cylinder 5 can move axially to impart an angular rotation to the rotatory web 2 of wires relative to the work piece 1 to be cut.

FIG. 1b is a perspective view illustrating the principles of a known rotatory support table, which is presently used as an alignment means. The work piece 1 to be cut is pressed against the web 2 of wires supported by the fixed wire guiding cylinders 4. The rotatory platen 7 is sandwiched between the support table 3 and the work piece 1 to be cut. The support table 3 on which is fastened the rotatory platen 7 and the work piece 1 to be cut, moves along direction 6. The work piece 1 to be cut can rotate around its axis by an angle a, by virtue of the rotatory platen 7.

FIG. 2a is a schematic top view of a possible construction made in accordance with the principles of the present invention. The rotatory web 2 of wires can be adjusted angularly by an angle a, relative to the fixed wire guide 4 by the motion of the adjustable wire guide 4. The work piece 1 to be cut is fixed.

FIG. 2b is a schematic top view of a construction made in accordance with principles presently known. The work piece 1 to be cut mounted on the rotatory support table can rotate over an angle a relative to the fixed web 2 of wires held by fixed wire guides 4.

The longitudinal cross-sectional view of FIG. 3 shows an example of a mechanism making possible the axial motion of one of the wire guiding cylinders 5 for the adjustment of the rotatory web of wires. The wire guiding cylinder 5 is mounted rotatably around the fixed shaft 8 by means of the bearing 9. The fixed support 10 is comprised of a threaded flange 11 fastened to the frame (not illustrated) of the cutting device and cooperating with a threaded part of the fixed shaft 8. Further, a tightening nut 12 is provided and also a square shaped end 13 making possible the adjustment of the position of the shaft 8 and hence of the wire guide 5. On the other hand, the fixed shaft 8 is held by the flange 21 integral with the frame, but it can slide axially within said flange. The square shaped end 13 can be rotated for the angular adjustment of the web of wires, by any appropriate means 22, such as, for example, manually using a spanner, electrically by means of an electrical motor or further by pneumatic or hydraulic means. After the adjustment, the tightening nut 12 is tightened fast against the threaded flange 11 in such a manner as to immobilize the shaft 8 in its adjusted axial position.

In the embodiment illustrated in FIG. 4, the wire guiding cylinders 4 are affixed to a plate 13. The plate 13 can rotate by virtue of a hinge 14, around an axis 15 perpendicular to the web 2 of wires. A screw mechanism 16 makes it possible to adjust by rotation the angle a of the plate 13 relative to the frame 17 of the cutting device including the fixed support table 3 with the work piece 1 to be cut. An optical or a video installation makes possible the adjustment of the angle a.

This installation preferably includes two optical aiming devices 18 or two video cameras mounted on the frame 17 and capable of being moved in a direction running parallel to the web 2 of wires. Thus, by aiming a predetermined wire of the web 2 of wires, the angular orientation of the same relative to the fixed support table 3 can be adjusted precisely from the knowledge of the position occupied by the two aiming means 18 or by the two video cameras.

The embodiment illustrated in FIG. 5 includes fixed wire guiding cylinders 4, as well as a support table 3 which is fixed angularly, but capable of being moved along a vertical direction 6 to press the work piece 1 to be cut against the web 2 of wires. This embodiment includes a mechanism 24 designed for moving all the web 2 of wires or a portion thereof along the surface of at least one of the wire guiding cylinders 4, by shifting the wires into other grooves provided at the surface of the cylinders. For this purpose, this mechanism 24 can include a comb 25 capable of contacting the wires and of shifting the same laterally along the wire guide, by means of a rotatable crank 26. This comb 25 will hence move simultaneously a portion or the totality of the wires. This comb could also be replaced by a member such as a hook, constructed to carry out the displacement of the wires one by one or by groups, along the surface of one of the wire guiding cylinders.

The cutting wire forming the web 2 of wires between the wire guiding cylinders 4 is made of a steel used for springs and it has a diameter comprised between 0.1 and 0.2 mm and can cut blocs of materials which are hard or unusual (such as silicon, ceramic materials, compounds of groups III–V, gadolinium-gallium garnets, sapphires, etc) into slices about 0.1 to 5 mm thick. The abrasive agent is a product sold commercially and can be comprised of diamond, silicon carbide, alumina, etc. The abrasive can either be bonded to the wire or coated as a slurry.

The construction of a rotatory web incorporated into the cutting device makes it possible to achieve an assembly which is easier to use, more rigid and hence more robust, and to achieve optimal performance and productivity, owing to the simplification of the adjustment operations and to improved versatility, without having any detrimental effects on the quality of the slices produced.

It is quite obvious that the embodiments described above have no limiting character and can receive all manners of desirable modifications within the framework of the appended claims. In particular, the construction of a rotatory web of wires through the use of other types of mechanisms can be envisaged, provided they be capable of rotating the web of wires relative to the fixed support table. The optical or the video installation described with reference to FIG. 4 can also be incorporated into the embodiments illustrated in FIGS. 1a and 5. The angular displacement of the plate 13 or of the comb 25 can be ensured by any mechanical, electrical, pneumatic or hydraulic means.

I claim:

1. A cutting device comprising:

at least two wire guiding cylinders, each of said cylinders having plural spaced apart grooves in an outer surface thereof;

a web of wires around said cylinders and held taut within said grooves;

a support table for holding a work piece to be cut by said web of wires, said web of wires being aligned between said cylinders at a first angle relative to said support table; and angle changing means for realigning said web of wires between said cylinders to a second angle relative to said support table that is different from said first angle.

2. The device of claim 1, wherein said angle changing means comprises a plate pivotally mounted on a frame that also carries said support table, wherein said cylinders are mounted on said plate so that pivotal movement of said plate realigns said web of wire relative to said support table.

3. The device of claim 1, wherein said angle changing means comprises means for axially moving one of said cylinders relative to another of said cylinders.

4. The device of claim 3, wherein said means for axially moving comprises a shaft about which said one of said cylinders rotates and which has one threaded end, and fixed bearings for supporting said shaft, one of said fixed bearings comprising a threaded flange for engaging said one threaded end to axially move said shaft.

5. The device of claim 4, wherein said means for axially moving further comprises a tightening nut engaging said one threaded end and acting with said one fixed bearing to stop axial movement of said shaft.

6. The device of claim 1, wherein said angle changing means comprises a comb for engaging said web of wires between said cylinders to shift said web of wires axially on the outer surface of one of said cylinders.

7. The device of claim 1, wherein said angle changing means moves at least one wire of said web of wires at a time axially from one set of said grooves to another set of said grooves on the outer surface of one of said cylinders.

8. The device of claim 1, further comprising at least one optical member mounted on said support table for monitoring realignment of said web of wires.

9. The device of claim 8, wherein said optical member comprises a video camera.

10. The device of claim 1, wherein said angle changing means comprises actuation means powered by one of manual, electric, pneumatic, and hydraulic power.

\* \* \* \* \*